(12) United States Patent
Ziller et al.

(10) Patent No.: US 10,507,797 B2
(45) Date of Patent: Dec. 17, 2019

(54) VEHICLE KEY FOR PASSIVE ACCESS SYSTEMS AND CORRESPONDING METHOD

(71) Applicant: HUF HÜLSBECK & FÜRST GMBH & CO., Velbert (DE)

(72) Inventors: Boris Ziller, Ratingen (DE); Thomas Skaletz, Meerbusch (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 16/062,025

(22) PCT Filed: Nov. 2, 2016

(86) PCT No.: PCT/EP2016/076358
§ 371 (c)(1),
(2) Date: Jun. 13, 2018

(87) PCT Pub. No.: WO2017/102163
PCT Pub. Date: Jun. 22, 2017

(65) Prior Publication Data
US 2019/0031143 A1  Jan. 31, 2019

(30) Foreign Application Priority Data
Dec. 14, 2015 (DE) ......................... 10 2015 121 736

(51) Int. Cl.
*G07C 9/00* (2006.01)
*G05B 19/00* (2006.01)
(Continued)

(52) U.S. Cl.
CPC ...... *B60R 25/246* (2013.01); *G06K 19/07792* (2013.01); *G07C 9/00309* (2013.01);
(Continued)

(58) Field of Classification Search
CPC ........... G06K 19/0723; G06K 19/0726; G06K 19/07767; G06K 19/07792;
(Continued)

(56) References Cited

U.S. PATENT DOCUMENTS

| 7,602,274 | B2 * | 10/2009 | Lee ..................... G06K 19/0723 340/10.2 |
| 2002/0033752 | A1 * | 3/2002 | Greenwood .......... B60R 25/246 340/5.61 |

(Continued)

OTHER PUBLICATIONS

International Search Report of International Application No. PCT/EP2016/076358 dated Feb. 7, 2017, 4 pages.
(Continued)

*Primary Examiner* — Dionne Pendleton
(74) *Attorney, Agent, or Firm* — Fay Sharpe LLP

(57) ABSTRACT

A radio key for an access system of a motor vehicle includes a receiver circuit with at least three LF receiver coils for reception of a low frequency signal. The receiver coils are oriented in different spatial directions. A central control circuit includes a microcontroller coupled to the receiver circuit. The control circuit with the microcontroller can assume an energy-reduced resting state and an active operating state. The receiver circuit is configured to awaken the control circuit from the resting state when a signal is received by the LF receiver coils. The central control circuit is configured to activate each of the LF receiver coils separately and to query a received signal strength. The central control circuit then selects the LF receiver coil with the highest signal strength for a subsequent signal reception.

2 Claims, 2 Drawing Sheets

(51) Int. Cl.
   *B60R 25/24* (2013.01)
   *G06K 19/077* (2006.01)
(52) U.S. Cl.
   CPC ............ *G07C 2009/0038* (2013.01); *G07C 2009/00365* (2013.01); *G07C 2009/00373* (2013.01)
(58) Field of Classification Search
   CPC ........... G06K 19/0724; G06K 7/10366; H01Q 1/3241; H01Q 25/00; H01Q 5/35; H01Q 7/00; H01Q 1/2225; H01Q 1/3233; H01Q 1/3266; H01Q 1/3283; H01Q 21/28; H01Q 21/29; H04B 1/18; H04B 5/0031; H04B 5/0037; H04B 5/0062; H04B 5/0068; H04L 27/06; H04L 2209/84; H04L 27/12; H04L 5/143; H04L 5/16; H04L 9/0875; H04L 9/3271; B60R 25/246; B60R 25/24; B60R 2325/101; B60R 2325/105; B60R 2325/205; G07C 2009/00365; G07C 9/00309; G07C 2009/00373; G07C 2009/0038; G07C 2009/00198; G07C 2009/00396; G07C 2009/00547; G07C 2009/00793; G07C 2209/65; H04W 12/06; H04W 4/40; H04W 80/00
   See application file for complete search history.

(56) References Cited

U.S. PATENT DOCUMENTS

| | | | |
|---|---|---|---|
| 2007/0257771 A1* | 11/2007 | Moser | B60R 25/24 340/5.61 |
| 2013/0107762 A1* | 5/2013 | Meier | H04W 80/00 370/277 |
| 2017/0050615 A1* | 2/2017 | Schindler | B60R 25/24 |

OTHER PUBLICATIONS

International Preliminary Report on Patentability (Written Opinion) of International Application No. PCT/EP2016/076358 dated Jun. 19, 2018 with English Translation, 18 pages.

* cited by examiner

VEHICLE KEY FOR PASSIVE ACCESS SYSTEMS AND CORRESPONDING METHOD

BACKGROUND

The invention relates to a radio key for an access system of a vehicle. In particular, the invention relates to a radio key (also referred to as ID transponders) for so-called passive access systems such as keyless entry systems.

Various vehicle keys for passive access systems are known from the prior ad. By way of example, a vehicle key from the family of the inventive vehicle keys is described in U.S. Pat. No. 7,602,274 B2. The vehicle key has a coil assembly configured as a so-called 3D coil assembly for signal reception in the low frequency (LF) frequency range. Three antenna coils are oriented in different spatial directions, in order to be able to receive a low frequency signal transmission (e.g. at 125 kHz) from the vehicle when the vehicle key is in any position.

Such a 3D coil assembly is coupled to an associated receiver circuit. The key also has a control circuit, which in turn is coupled to the receiver circuit. The low frequency signal transmission from the vehicle to the vehicle key is used to wakeup the vehicle key, in particular its control circuit, from a resting state, and initiate a subsequent communication in the high frequency range. For this, the vehicle key also has at least one high frequency antenna configured for high frequency communication in addition to the LF antennas, and an associated transmission circuit.

Because the energy resources for the mobile radio key should be conserved, the vehicle key should not be activated too frequently. For this reason, the central control circuit of the radio key, which contains a microcontroller and a dedicated means for executing program code is only woken up when the receiver circuit receives an appropriate signal in the low frequency range via the 3D coil assembly.

Products are available an the market that combine numerous of the aforementioned components to form modules, and more or less integrate said. By way of example, products from Texas Instruments are known, which integrate coil assemblies with receiver circuits (TI car access product family).

The keys of the specified type are provided in particular for so-called polling, i.e. systems querying the surroundings at regular intervals from the vehicle via LF signals.

With such systems that have numerous LF receiver coils, it is normal to select one of the coils for a subsequent signal reception for decoding the low frequency signals when a low frequency signal has been received by the 3D coil assembly. This selection can be in accordance with various criteria. It has proven, however, to be the case that such an approach for selecting a coil is associated with problems regarding the performance and reliability of the coil selection.

The object of the invention is to improve the reliability of the performance of a radio key with a 3D coil assembly.

BRIEF SUMMARY

This problem is solved by a radio key that has the features of claim 1, and a method that has the features of claim 3.

According to the invention, the central control circuit is first woken up by the receiver circuit of the 3D coil assembly after receiving a wakeup signal. The process for receiving a wakeup signal (or wakeup pattern) is known, and the receiver circuits available on the market generate corresponding signals at downstream circuits in response to a received signal in a carrier frequency ranging from 115 kHz to 150 kHz, wherein detection of a wakeup signal by the receiver circuit requires very little energy.

After the central control circuit with the microcontroller is awoken from a resting state, this control circuit with the microcontroller queries each individual coil in the 3D coil assembly separately. This means that even if the receiver circuit has already selected one of the receiver coils, the signals are again evaluated at each of the coils of the 3D coil assembly after the waking up, under the control of the central control circuit. It has proven to be the case that, due to the temporal sequences, as well as the modified system conditions in the vehicle key when the control circuit is awake, the LF reception is significantly more reliable when the central control circuit evaluates the signals in each of the coils after the waking up, and then selects one of the coils for the LF reception and decoding of the signals.

The substantial feature of the invention is thus not the selection of a coil, but rather, the point in time of the selection or re-selection of one of the coils, wherein the selection of the coils by the central control circuit is implemented on the basis of a program running in the microcontroller, and not by a receiver circuit, potentially integrated in the coils. The coil selection is initiated according to the invention accordingly after receiving the wakeup pattern.

The coil can be selected by the software on the basis of the signal strength (RSSI value) received by the coil, or on the basis of the determined response times of the coils.

The coil displaying the greatest signal strength of the received LF signals when the central control circuit with the microprocessor is active is normally selected.

The selected coil is used for receiving and decoding incoming low frequency signals in the downstream method steps performed by the central control device. Depending on the incoming data, high frequency communication with the vehicle is then initiated.

In systems according to the prior art, an RSSI detection is likewise carried out in the course of the security check, but this is used to locate the vehicle key in relation to the vehicle. With the invention, the RSSI measurement is carried out in order to determine which of the LF coils receives the signal with the highest field strength. The data are first then decoded by the selected coil. The RSSI data can later be used to locate the vehicle key, making a further RSSI measurement superfluous.

A substantial advantage of the system and method described above is that existing systems can be retrofitted for this method, because the coil selection process is implemented as control software in the software of the central control device, and can also be modified. The software-based coil selection has proven to be significantly better in field testing of an upstream selection by integrated components of the LF receiver circuit, because a significantly improved reliability of the system is obtained.

BRIEF DESCRIPTION OF THE DRAWINGS

The invention shall now be described in greater detail based on the attached drawings.

DETAILED DESCRIPTION

Figure 1:
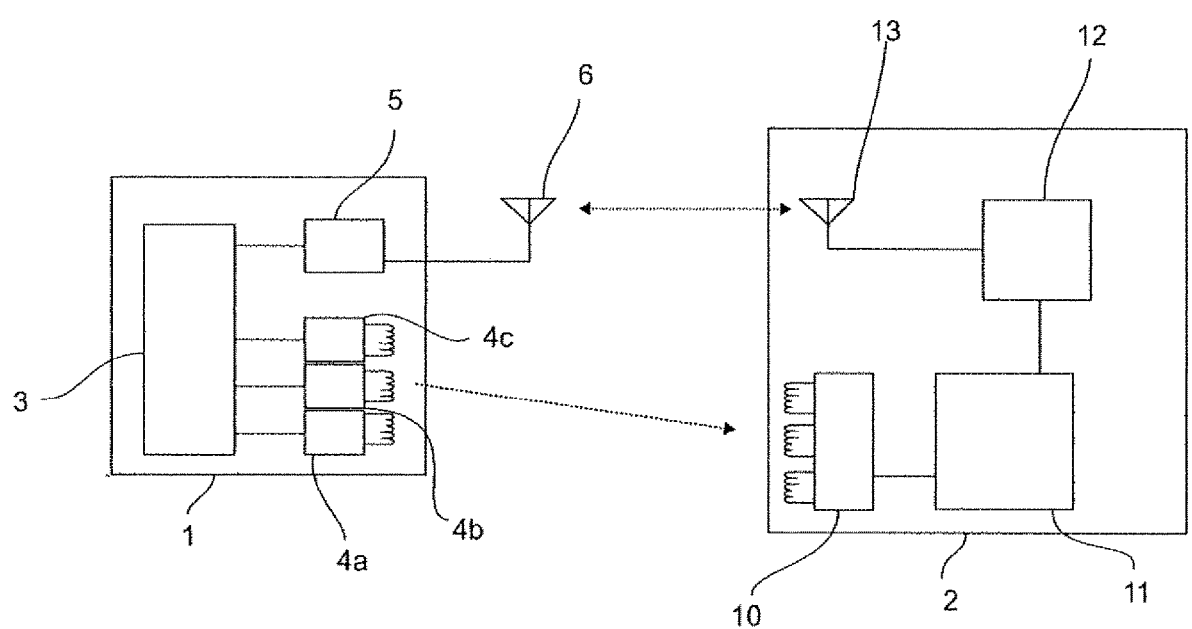
FIG. 1 shows, schematically, a system composed of a vehicle-side communication unit and a mobile vehicle key.

A schematic view of a vehicle-side communication device 1 is shown in FIG. 1.

A vehicle key 2 interacts with the communication unit 1 via a wireless communication connection, in order to make a passive access system available. A central control device 3 is incorporated in the vehicle-side communication unit. Numerous transmission coils 4a, 4b, 4c for a low frequency (LF) communication are coupled to the central control device 3. The low frequency communication takes place in this example at 125 kHz. Furthermore, a communication circuit 5 is provided, which is coupled to a high frequency antenna 6. A high frequency communication can be carried out via the communication circuit 5 by activating the antenna 6.

An LF communication module 10 is disposed in the vehicle key 2, which has a receiver circuit, and coils for receiving low frequency signals coupled to the receiver circuit. The coils are configured as a so-called 3D coil assembly. The individual coils face in different spatial directions thereby, to enable an improved reception of the low frequency signals when the vehicle key 2 is in any position.

A control device 11 is coupled to the receiver circuit 10, which can assume an energy-reduced standby mode. The standby mode is an energy-reduced state, in which the energy consumption of the device in the vehicle key 2 is decreased, because the control device is inactive. It is possible to wakeup the control circuit 11 by an activation thereof via the receiver circuit 10, when it receives an appropriate wakeup signal.

The control device 11 has a microcontroller and a memory for executable program codes. Furthermore, a communication circuit 12 is coupled to the control device 11, which in turn is connected to a transceiver antenna 13 for high frequency communication.

When in operation, the communication unit of the vehicle transmits wakeup signals via the antennas 4a, 4b, 4c in short time intervals (e.g. 250 ms), for waking up a vehicle key in the proximity of the vehicle, Such a system, which repeatedly queries the surroundings, is referred to as a so-called polling system. If the key 2 is in the proximity of the vehicle, the field strength of the LF wakeup signals is sufficient for detection by the receiver device 10. The wakeup signal is received by the receiver device 10, and the control device 11 is then woken up in response to the wakeup signal, thus activating it to an operating state.

It is fundamentally possible for the receiver circuit 10 to already make a pre-selection of one of the receiver coils of the receiver circuit 10 based on the received wakeup signal and the signals of the 3D coil assembly. It is provided according to the invention, however, that after the waking up of the control device 11, this control device 11 activates each of the coils in the 3D coil assembly. Depending on the signal responses, in particular an RSSI value determination, the control circuit 11 selects one of the coils in the receiver circuit 10, via which the low frequency signals are received. The signals are subsequently decoded, and based on the decoded signals, a high frequency communication via the communication circuit 12 and the antenna 13 is initiated with the corresponding vehicle-side components, the antenna 6 and the communication circuit 5.

Figure 2:
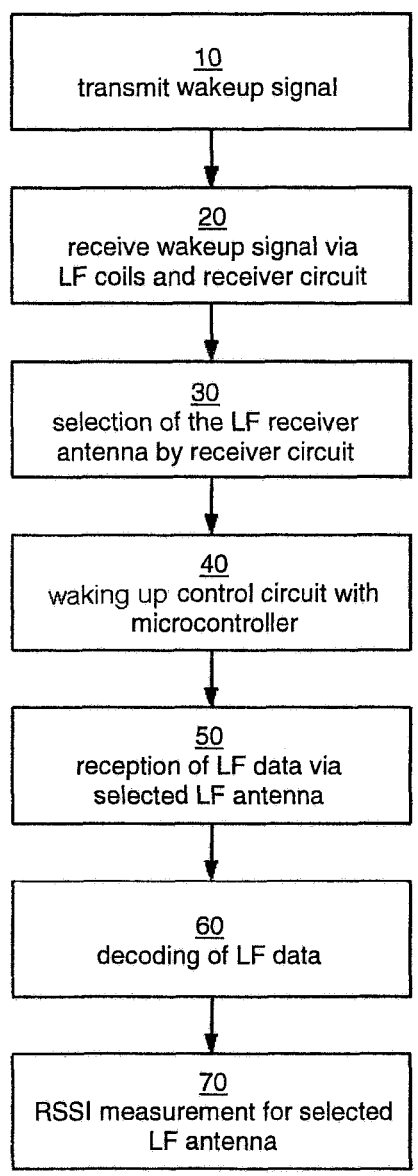
FIG. 2 shows a flow chart for a keyless entry method according to the prior art.

FIG. 2 shows a method for selecting the antenna according to the prior art, in order to illustrate the differences to the method according to the invention.

According to the prior art, a wakeup signal is transmitted in the low frequency range by the vehicle in step 10. A vehicle key receives the wakeup signal via a 3D coil assembly. The receiver circuit that is coupled to the coils for low frequency communication selects the LF receiver antenna that is to be used based on the signal strengths of the individual antennas or their response times. The control circuit with the microcontroller in the vehicle key is subsequently woken up. The low frequency data are received via this pre-selected antenna, and the data are then decoded.

In the further course of authentication of the vehicle key, an RSSI determination of the received signal strengths can later take place. This is then carried out in turn using the antenna coil pre-selected by the receiver circuit. This RSSI determination is used to determine more precisely the Position of the vehicle key in or around the vehicle, e.g. in order to validate authorization for executing a function.

Figure 3:
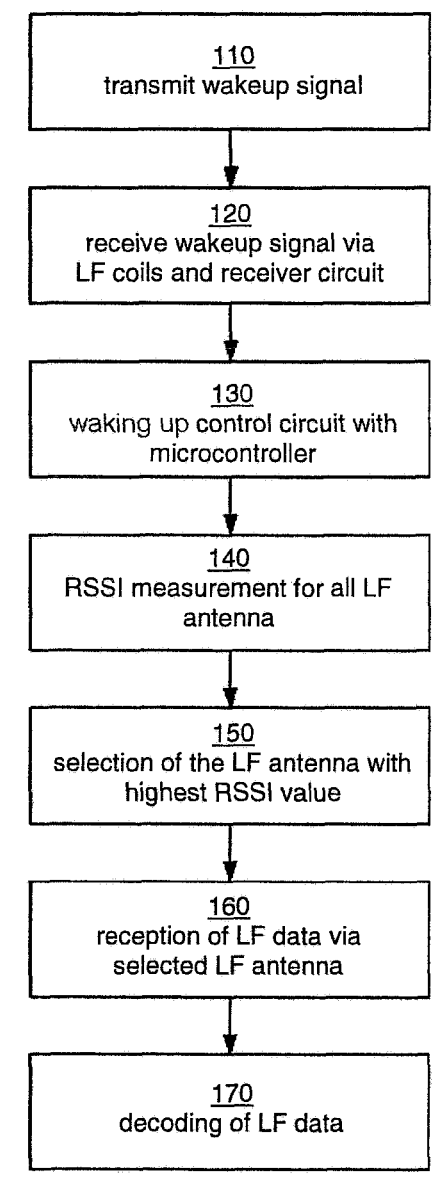
FIG. 3 shows the sequence of a keyless entry method according to the invention.

FIG. 3 shows a corresponding relationship according to the invention. In accordance with the invention, the sequence of the steps is changed, and the means for executing the respective steps are modified.

A wakeup signal is likewise transmitted by the vehicle in step 110, which is then received via the LF coil assembly and the associated receiver circuit in step 120.

The control circuit with the microcontroller is subsequently woken up, as shown in step 130. The microcontroller in the control circuit executes an RSSI query for each of the low frequency antennas in the 3D antenna assembly in step 140. Based on the determined values, the antenna with the highest RSSI value is then selected. The selection of the coil that is selected for low frequency data reception, and thus for receiving the data that are to be decoded, therefore does not take place in the receiver circuit, but takes place instead in the control circuit with the microprocessor, this being after the wakeup process. It is thus essential that, in accordance with the invention, the microcontroller in the control circuit is first woken up, and only after this is a coil in the 3D coil assembly selected for data reception and decoding. The coil selection is made thereby by a control part of the key, which is in a standby mode when the LF reception first takes place, and is only available after a wakeup process.

Data reception of the low frequency signals via the selected antenna subsequently takes place, as shown in step 160, and the received data are then decoded in step 170.

In the further course of the method, the determined RSSI data can be used for a further evaluation of the position of the vehicle key in relationship to the vehicle. It is not necessary to carry out a further determination of the RSSI data, because the measurements by the microcontroller in the active state can already be referenced. Nevertheless, a further RSSI query can fundamentally take place in the later course of the authentication.

The invention claimed is:

1. A radio key for an access system of a motor vehicle, comprising a receiver circuit with at least three LF receiver coils for a low frequency signal reception, wherein the LF receiver coils are oriented in different spatial directions, a central control circuit comprising a microcontroller, wherein the control circuit including the microcontroller can assume various operating states, at least one of which is an energy-reduced resting state, and one of which is an active operating state, wherein the receiver circuit is coupled to the central control circuit, wherein the receiver circuit is configured to detect LF wakeup signals and to wake up the control circuit from the energy-reduced resting state when such a wakeup signal is received through the LF receiver coils by the receiver circuit, wherein the central control circuit is configured to activate each of the LF receiver coils of the receiver circuit separately after it has been woken up from the resting state, and to query a received signal strength of each of the receiver coils, wherein the control circuit selects the LF receiver coil with the highest signal strength for a subsequent signal reception.

2. The radio key according to claim 1, wherein the receiver circuit with the LF coil assembly is configured as an integrated module, and wherein the control circuit is separate from the integrated module.

* * * * *